United States Patent
Katayama

(10) Patent No.: US 10,591,372 B2
(45) Date of Patent: Mar. 17, 2020

(54) SYSTEM AND METHOD FOR MEASURING CABLE TENSION OR PRESSURE FOR A MODULE INTEGRATED CABLE

(71) Applicant: Schlumberger Technology Corporation, Sugar Land, TX (US)

(72) Inventor: Makito Katayama, Yamato (JP)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 195 days.

(21) Appl. No.: 15/373,532

(22) Filed: Dec. 9, 2016

(65) Prior Publication Data

US 2017/0167242 A1 Jun. 15, 2017

Related U.S. Application Data

(60) Provisional application No. 62/264,864, filed on Dec. 9, 2015.

(51) Int. Cl.
*G21C 13/024* (2006.01)
*G01L 5/101* (2020.01)

(52) U.S. Cl.
CPC .................................. *G01L 5/101* (2013.01)

(58) Field of Classification Search
CPC .......... G01L 5/101; G01L 5/103; G06F 19/00; G01V 1/00; G01V 1/40; E21B 47/0006; E21B 47/00
See application file for complete search history.

(56) References Cited

U.S. PATENT DOCUMENTS

| | | | |
|---|---|---|---|
| 4,265,110 A | 5/1981 | Moulin | |
| 6,333,897 B1 | 12/2001 | Knudsen et al. | |
| 7,894,297 B2 | 2/2011 | Nutt et al. | |
| 7,962,288 B2 | 6/2011 | Gleitman | |
| 2014/0174725 A1 | 6/2014 | Dalvi et al. | |

*Primary Examiner* — Harshad R Patel
*Assistant Examiner* — Nigel H Plumb
(74) *Attorney, Agent, or Firm* — Eileen Pape

(57) ABSTRACT

A measurement device, method, and integrated module for a cable array for determining a downhole parameter are provided. The measurement device, method and integrated module may include a first strain gauge mounted perpendicularly along a central axis of a tension member and a second strain gauge mounted a distance away from but parallel to the central axis of the tension member. The first strain gauge and the second strain gauge may be configured to measure strain induced by at least one of tension or downhole pressure. In addition, the measurements from the first and the second strain gauge may be used to determine the cable tension for the integrated module of the cable array.

16 Claims, 2 Drawing Sheets

Downhole Array Cable and Module

Downhole Module Description

Cable Tension and Responding Stress Applied to Module

Pressure and Responding Stress Applied to Module

SYSTEM AND METHOD FOR MEASURING CABLE TENSION OR PRESSURE FOR A MODULE INTEGRATED CABLE

RELATED APPLICATIONS

This application claims the benefit of a related U.S. Provisional Application Ser. No. 62/264,864, filed Dec. 09, 2015, entitled "System and Method for Measuring Cable Tension or Pressure," to Makito KATAYAMA, the disclosure of which is incorporated by reference herein in its entirety.

BACKGROUND

The following descriptions and examples are not admitted to be prior art by virtue of their inclusion in this section.

In downhole operations such as seismic measurement, a current business trend is to have an increasing number of sensor modules for a cable array. In part, because large quantities of sensor module recordings contributes to a combination of reduced operation time and results in providing a higher quality of data. For example, some companies produce downhole seismic array tools which have more than 100 receiver modules within a single array structure.

In order to use more receivers, one element for further development of downhole array tools is the efficient use of a stress member of the cable. The large number of mechanical joints of the tension member between the cable and the many modules result in increasing tool weight due in part to the complexity of the mechanical connections.

In such long array tools, cable tension measurements are required to detect points or locations where cable stacking is occurring. Cables with integrated modules may be used to help avoid numerous complex and heavy mechanical connections. However, with a cable comprising integrated modules, cable tension cannot be readily measured because tension force is not applied directly to the integrated sensor module.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments of the claimed disclosure may comprise a measurement device for determining tension in a cable array. The measurement device may include a first strain gauge mounted perpendicularly along a central axis of a tension member and a second strain gauge mounted a distance away from but parallel to the central axis of the tension member. The first strain gauge and the second strain gauge may be configured to measure strain induced by at least one of tension or downhole pressure. In addition, the measurements from the first and the second strain gauge may be used to determine the tension at that point in the cable array.

Additional embodiments of the claimed disclosure may comprise a method for determining a parameter along an integrated sensor module in a cable array. The method may include mounting a first strain gauge along and orthogonal to a central axis of a tension member and mounting a second strain gauge apart from but parallel to the central axis of the tension member. The method may further include reading the strain measurements from the first strain gauge and the second strain gauge and computing the parameter from the readings.

Other embodiments of the claimed disclosure may comprise an integrated sensor module containing configured to measure a downhole parameter. The integrated sensor module may include a module housing having an interior surface. The integrated sensor module may further include a first strain gauge mounted to one end of the interior surface and a second strain gauge mounted to a side of the interior surface, where the one end is orthogonal to the side. The tension and pressure induced compression of an exterior of the housing may be measured by the first and second strain gauge. The downhole parameter may be determined from the first and second strain gauge measurements.

Other or alternative features will become apparent from the following description, from the drawings, and from the claims.

BRIEF DESCRIPTION OF THE DRAWINGS

Certain embodiments will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

Figure 1:
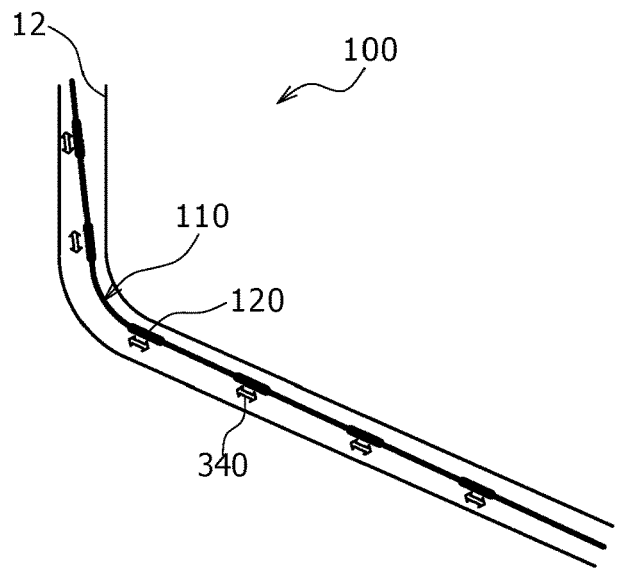
FIG. 1 is a schematic illustration of a downhole array cable and module, according to an embodiment of the disclosure.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

As used throughout the specification and claims, the term "downhole" refers to a subterranean environment, particularly in a wellbore. "Downhole tool" is used broadly to mean any tool used in a subterranean environment including, but not limited to, a logging tool, an imaging tool, an acoustic tool, a permanent monitoring tool, and a combination tool.

Embodiments of this disclosure concern a method to allow the measuring of cable tension from a module integrally located in a cable assembly for downhole array tools. In a downhole operation such as seismic measurement, it is a generally increasing trend to have as many sensor modules provided on an array cable as possible. This may be due in part because a large numbers of sensor recording modules can result in minimal operation time while providing high quality data.

To gain more receivers, efficient use of a cable stress member is one component to consider for the further development of a downhole array tool. The use of many mechanical joints for tension members located between the cable and the modules results in an increased tool weight. In some cases, the increased tool weight is because the multiple mechanical connections are relatively heavy and complex. To resolve this issue, some cable assemblies have addressed how to avoid extraneous mechanical connections between cable and modules. These ideas include locating the modules inside of the armored cable (e.g., module integrated cable or cable with integrated modules).

In long array tools, cable tension measurements can be used to detect cable stacking points or locations along the tool. These cable tension measurements have previously been incorporated at the mechanical connections between the cable and the modules. However, module integrated cables are more efficient in their use of components and generally avoid correspondingly large numbers of mechanical connections for large numbers of integrated modules. As a result, when using a module integrated cable, cable tension cannot be as readily measured because the tension force is not applied directly to the connection between the sensor module and the cable.

Embodiments of this disclosure include methods to measure the cable tension for a module integrated cable. Generally, some exemplary embodiments of the cable tension measurement system use an understanding that the cable tension is correlated to the compression stress applied to the module housing. In some embodiments, the measurement system comprises two (2) strain gauges and an associated acquisition system.

Referring generally to FIG. 1, this figure illustrates a downhole cable array system 100 comprising a plurality of integrated modules 120 connected by a module integrated cable 110, according to an embodiment of this disclosure. The downhole operation shown in the figure may be for a wireline deployed seismic measurement, but other embodiments may not be limited to this exemplary application. The figure has multiple integrated modules 120 in the module integrated cable 110 and is shown in a deviated wellbore 12 extending at an angle from vertical.

Figure 2:
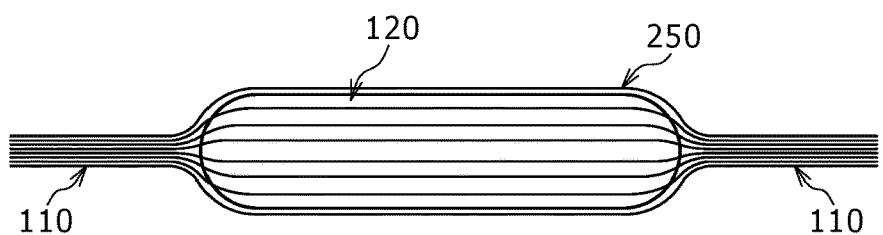
FIG. 2 is a schematic illustration of a downhole module, according to an embodiment of the disclosure.

In this exemplary embodiment, as seen in exemplary FIG. 2, an integrated module 120 and module integrated cable 110 is surrounded by a tension member 250 that extends beyond the integrated module 120 and corresponding module integrated cables 110 to the next integrated module, cables, components, or to the surface of the well bore. The tension member 250 in this embodiment is shown in a relatively continuous manner as encompassing, surrounding, or containing the integrated module 120 and module integrated cables 110 and down.

A cable tension measurement system for such a downhole cable array system 100 may use the relationship between cable tension and compression stress on the integrated module 120 housing. The compression stress applied to the integrated module 120 housing can be converted to cable tension at that point in the cable array system 100.

Figure 3:
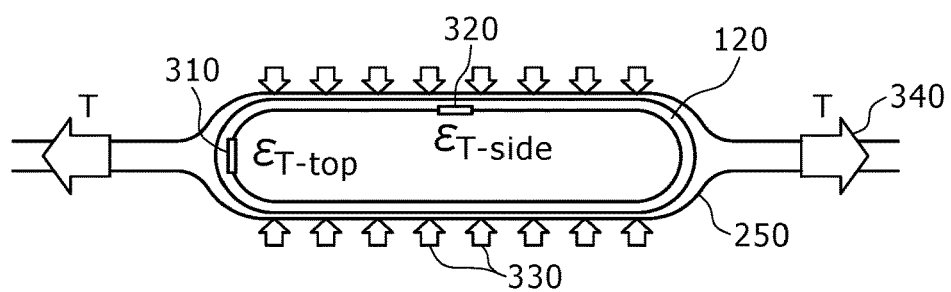
FIG. 3 is a schematic illustration of cable tension and responding stress being applied to a module, according to an embodiment of the disclosure.

Referring generally now to exemplary FIG. 3, tension 340 (see arrows; see also FIG. 1) is applied along the cable array system 100 resulting in compressive stress to the integrated module 120 housing. In some embodiments of the tension measurement system, two strain gauges are used and located on inner surfaces of the housing of the integrated module 120. Other embodiments may include more strain gauges some less, while still other embodiments may position the strain gauges in alternative or multiple positions. In this example, one strain gauge 310 is provided on an edge of the integrated sensor module's 120 housing (i.e., top, or left hand side of the figure) and another strain gauge 320 is provided on the cylindrical surface of the housing (i.e., side).

When deployed, there are two significant types of stresses that need to be taken into consideration: compression 330 due to the tension 340 in the tension member 250 and compression 330 due to surrounding downhole pressure (FIG. 3 compression arrows represent a combination of tension induced compression and compression due to downhole pressure). When tension 340 is applied to the cable array system 100, the outer cylindrical surface of integrated modular 120 housing is compressed due to the reaction of the tension member. However, the top and bottom edges (i.e., left and right sides as shown, where strain gauge 310 is also shown as located for example) of the integrated sensor module's housing each edges of sensor housing aren't compressed.

Figure 4:
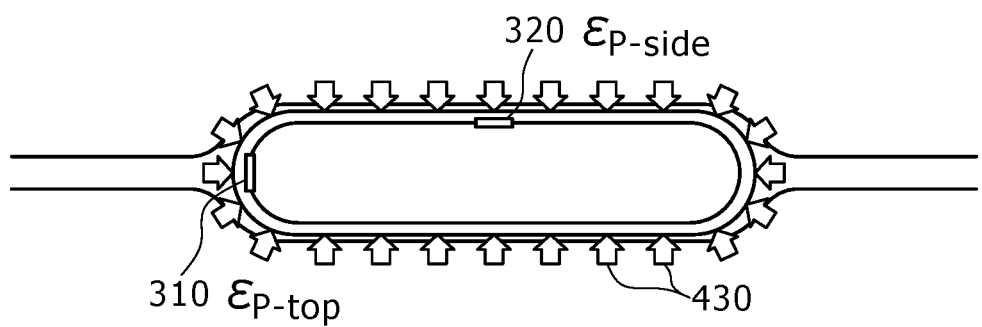
FIG. 4 is a schematic illustration of pressure and responding stress being applied to a module, according to an embodiment of the disclosure.

Strain gauge 310 measures the strain induced by tension 340 and the strain induced by pressure 430 (see FIG. 4). Strain gauge 320 also measures the strain induced by tension 340 and the strain induced by downhole pressure 430 acting on the top and bottom edges of the integrated module 120. However, each of the strain gauges 310 and 320 have different degrees of sensitivity to either pressure induced strain and tension induced strain. By comparing the results of the two strain gauges, 310 and 320, the pressure effects can be removed from the measurements, resulting in the strain primarily produced by tension 340. The tension 340 can be determined using an experimentally or mathematically determined relationship between the measured strain in the integrated module housing 120 and corresponding tension 340, such as in a constant pressure environment for example.

Turning generally now to FIG. 4, when downhole pressure 430 is applied to the integrated module 120 housing, compression is applied to every surface of integrated sensor module housing. The two types of compression (i.e., due to applying tension to the tension member and due to the surrounding conditions in the wellbore) are linearly independent to the two strains on the housing. Accordingly, pressure and the tension can be separately determined at the same time by using the two strain gauges 310 and 320.

By measuring the tension through the use of strain gauges, stacking locations along the cable array can be determined. Stacking refers to instances where a cable may become snagged or movement inhibited because of friction or some obstruction located downhole. Stacking is much more prevalent in deviated wells, requiring the use of a tractor or other mechanism to pull the cable array along the wellbore. Stacking would be indicated by comparing the tension measurements from one integrated sensor module to the other integrated sensor modules. As measurements are taken further down the cable array system 100, there should be a corresponding decrease in tension as the weight induced by the below suspended components of the cable array system 100 are reduced.

For a fully deployed, substantially vertical wellbore with no interior obstructions, the tension measurement for each integrated sensor module should be a function of the length or mass of cable array extending below the specific module. When the tension values do not correspond or correlate to their relative position in the cable array, this could provide an indication of stacking, i.e., a location where the cable array is caught on an obstruction or where friction forces counteract the mass effects of the cable array.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A measurement device for determining tension in a cable array system comprising:
   a first strain gauge mounted orthogonally along a central axis of an integrated sensor module; and
   a second strain gauge mounted a distance away from but parallel to the central axis of the integrated sensor module;
   wherein the first strain gauge and the second strain gauge are configured to measure strain induced by at least one of tension or downhole pressure;
   wherein the measurements from the first and the second strain gauge may be used to determine the tension at that point in the cable array system.

2. The measurement device as claimed in claim 1, wherein:
   the first and second strain gauges are provided in a housing for the integrated sensor module.

3. The measurement device as claimed in claim 2, wherein:
   the integrated sensor module is a seismic sensor.

4. The measurement device as claimed in claim 2, wherein the cable array system further comprises a tension member encompassing the integrated sensor module.

5. The measurement device as claimed in claim 2, wherein the first and the second strain gauge are mounted to an inner surface of the housing.

6. A method for determining a parameter along an integrated sensor module in a cable array system, comprising:
   mounting a first strain gauge along and orthogonal to a central axis of the integrated sensor module;
   mounting a second strain gauge apart from but parallel to the central axis of the integrated sensor module;
   reading the strain measurements from the first strain gauge and the second strain gauge; and
   computing the parameter from the readings.

7. The method of claim 6, wherein the parameter is tension of the integrated sensor module.

8. The method of claim 6, wherein the parameter is pressure applied to the integrated sensor module.

9. The method of claim 6, wherein the first and second strain gauges are further mounted to an integrated sensor module.

10. The method of claim 9, wherein the first and second strain gauges are mounted to an inner surface of the integrated sensor module.

11. The method of claim 6, wherein a tension member encompasses the first and second strain gauge.

12. The method of claim 6, wherein the first and second strain gauges measure strain due to compression of an integrated module housing.

13. The method of claim 6, wherein tension and pressure affect each of the first and second strain gauges to different degrees.

14. An integrated sensor module configured to measure a downhole parameter, comprising:
   a module housing comprising an interior surface and having a central axis;
   a first strain gauge mounted to one end of the interior surface along and orthogonal to the central axis; and
   a second strain gauge mounted to a side of the interior surface apart from but parallel to the central axis, where the one end is orthogonal to the side;
   wherein tension and pressure induced compression of an exterior of the housing are measured by the first and second strain gauge;
   wherein the downhole parameter may be determined from the first and second strain gauge measurements.

15. The integrated sensor module of claim 14, wherein the downhole parameter is tension in a surrounding tension member.

16. The integrated sensor module of claim 14, wherein the downhole parameter is downhole pressure.

* * * * *